(12) United States Patent
Gohil et al.

(10) Patent No.: US 11,899,738 B2
(45) Date of Patent: *Feb. 13, 2024

(54) METHODS AND APPARATUS FOR RECIPE DISCOVERY AND CONSUMPTION LOGGING

(71) Applicant: MYFITNESSPAL, INC., San Francisco, CA (US)

(72) Inventors: Palak Gohil, San Francisco, CA (US); Angeline Baniqued, San Francisco, CA (US); Shubhansha Agrawal, San Francisco, CA (US); Yuting Pu, San Francisco, CA (US)

(73) Assignee: MyFitnessPal, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/527,447

(22) Filed: Nov. 16, 2021

(65) Prior Publication Data
US 2022/0107987 A1 Apr. 7, 2022

Related U.S. Application Data

(63) Continuation of application No. 16/580,435, filed on Sep. 24, 2019, now Pat. No. 11,537,685.

(51) Int. Cl.
*G06F 16/958* (2019.01)
*G06F 16/908* (2019.01)
*G06F 16/9538* (2019.01)

(52) U.S. Cl.
CPC ......... *G06F 16/972* (2019.01); *G06F 16/908* (2019.01); *G06F 16/9538* (2019.01); *G06F 2216/03* (2013.01)

(58) Field of Classification Search
CPC .. G06F 16/972; G06F 16/908; G06F 16/9538; G06F 2216/03; G06Q 30/0631; G06Q 50/12; G06Q 30/0251
USPC .................................................. 707/722, 769
See application file for complete search history.

(56) References Cited

U.S. PATENT DOCUMENTS

| | | | | |
|---|---|---|---|---|
| 2005/0113649 | A1* | 5/2005 | Bergantino | G16H 20/10 600/300 |
| 2012/0179665 | A1* | 7/2012 | Baarman | G16H 20/60 707/E17.014 |
| 2014/0101233 | A1* | 4/2014 | Mina | G06F 16/972 709/203 |
| 2014/0287384 | A1 | 9/2014 | Boyes | |
| 2015/0294225 | A1* | 10/2015 | Takei | G05B 13/00 706/11 |

(Continued)

*Primary Examiner* — Phong H Nguyen
(74) *Attorney, Agent, or Firm* — Maginot, Moore & Beck, LLP

(57) ABSTRACT

System and method for recipe discovery and consumption logging. Improved solutions enable intelligent management of a user's personal fitness journey i.e., based on their overall health in their exercise and dietary habits. In one exemplary embodiment, recipes may be curated and tagged from a variety of sources such as health and fitness blogs and/or other articles of interest. Recipe tagging ensures that users can retrieve only the specific recipes of interest to them from a variety of sources which may be focused on the public at large. Additionally, the recipe discovery and consumption logging interface may enable users to log actual consumption activity for a selected recipe, including ad hoc user modifications to recipe ingredients.

19 Claims, 7 Drawing Sheets

(56) References Cited

U.S. PATENT DOCUMENTS

| | | | |
|---|---|---|---|
| 2018/0061270 A1* | 3/2018 | Chainer | G06Q 10/087 |
| 2018/0321989 A1* | 11/2018 | Shetty | H04W 4/21 |
| 2018/0353002 A1* | 12/2018 | Cronin | G06F 3/04847 |
| 2019/0099124 A1* | 4/2019 | Mattis | A61B 5/0205 |
| 2019/0122313 A1 | 4/2019 | Alemli et al. | |
| 2019/0164116 A1* | 5/2019 | Wallace | G06V 20/20 |
| 2019/0228856 A1* | 7/2019 | Leifer | G06F 16/9035 |
| 2019/0370916 A1* | 12/2019 | Surkin | H04L 67/53 |
| 2020/0026397 A1* | 1/2020 | Wohlstadter | G06F 3/0482 |
| 2020/0075152 A1 | 3/2020 | Radovcic | |

* cited by examiner

FIG. 1D

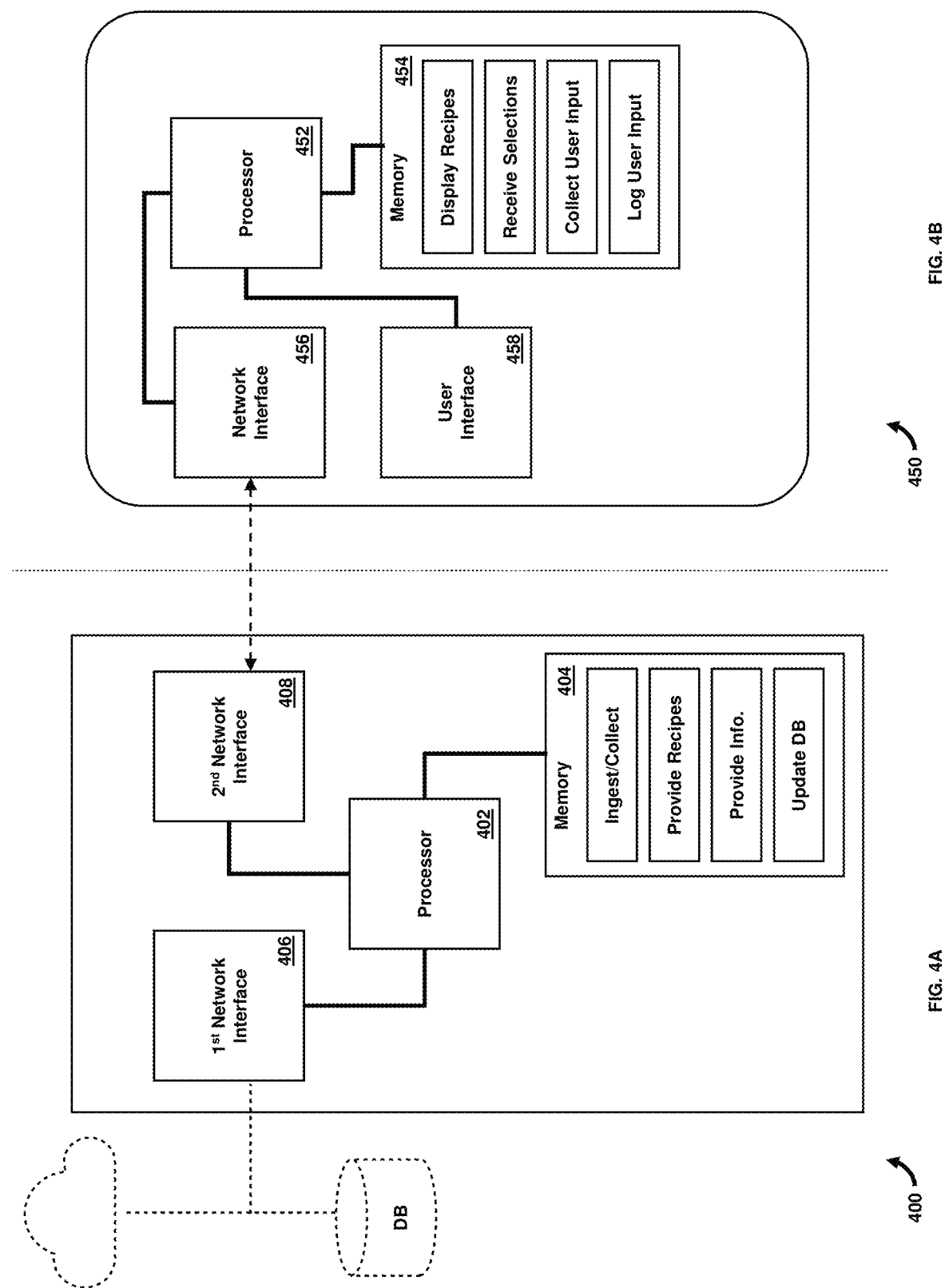

METHODS AND APPARATUS FOR RECIPE DISCOVERY AND CONSUMPTION LOGGING

CROSS-REFERENCE TO RELATED APPLICATION

This application is a continuation of U.S. patent application Ser. No. 16/580,435, filed Sep. 24, 2019, the entire contents of which are incorporated by reference herein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates generally to the field of nutrition logging. More particularly, the present disclosure relates to systems, computer programs, devices, and methods for discovering recipes and logging consumption activity for a user.

BACKGROUND

In recent years, health and fitness tracking applications that track food consumption have become very popular. Food consumption is important to a healthy lifestyle and is known to be related to various health conditions, such as diabetes and obesity to name a few. Health and fitness tracking applications allow users to set and achieve personalized health goals by tracking the foods and beverages that they consume. These applications enable users to gain insights that help them make smarter choices and create healthier habits.

However, food consumption tracking, even via computerized applications is often a time consuming and detailed process. Hence what is needed are improved methods for tracking or logging consumption.

SUMMARY

The present disclosure addresses the foregoing needs by disclosing, inter alia, methods, devices, systems, and computer programs for discovering recipes and logging consumption activity, thereby enabling a user to make smarter choices and create healthier habits.

In one aspect, a method for enabling recipe discovery and logging is disclosed. In one embodiment, the method includes: ingesting a plurality of recipes; associating a tag to a set of recipes of the plurality of recipes; providing the set of recipes and the tag to a user device; providing updated recipe information for a selected recipe of the set of recipes; and updating a user profile based on a user consumption data record associated with the selected recipe.

In one variant, the ingesting the plurality of recipes includes retrieving the plurality of recipes from a database of a plurality of published literature.

In one variant, the associating the tag to the set of recipes of the plurality of recipes includes copying the tag from the database of the plurality of published literature. In some cases, the tag from the blog database was manually assigned by a trusted individual.

In one variant, the associating the tag to the set of recipes includes determining whether each recipe of the plurality of recipes satisfies a conditional rule of the tag. For example, the conditional rule of the tag may specify at least a macronutrient quantity and a portion size.

In another aspect, a health tracking server configured to enable recipe discovery is disclosed. In one embodiment, the health tracking server includes: a network interface; a processor; and a non-transitory computer-readable medium comprising one or more instructions. In one exemplary embodiment, the one or more instructions cause the health tracking server to: in response to a request for a consumable item data record, provide the consumable item data record to a user device; receive a user consumption data record from the user device, where the user consumption data record identifies at least the consumable item data record; and update a user profile based on the user consumption data record.

In one variant, the consumable item data record includes a recipe associated with a plurality of consumable item data records and a corresponding plurality of portions. In some cases, the user consumption data record includes a modification to the plurality of consumable item data records or the corresponding plurality of portions.

In one variant, the user consumption data record includes a time or date of consumption.

In another variant, the user consumption data record includes a scheduled time or date that has not yet occurred and a preparation time. In one such case, the non-transitory computer-readable medium further includes one or more additional instructions, which when executed by the processor, causes the health tracking server to notify the user based on the scheduled time or date that has not yet occurred and the preparation time.

In another variant, the non-transitory computer-readable medium further includes one or more additional instructions, which when executed by the processor, causes the health tracking server to share the user consumption data record with at least one other user associated with the health tracking server.

In another variant, the update to the user profile is based on whether the user consumption data record adheres to a goal of the user.

In yet another aspect, a user apparatus is disclosed. In one embodiment, the user apparatus includes: a user interface; a network interface; a processor; and a non-transitory computer-readable medium comprising one or more instructions. In one exemplary embodiment, the one or more instructions, when executed by the processor, causes the user apparatus to:

display recipes associated with a recipe tag to a user; enable selection of a first recipe from the recipes; receive user recipe input; and based on the user recipe input, create a user consumption data record based on the user recipe input and the first recipe.

In one variant, the non-transitory computer-readable medium further comprises one or more additional instructions, which when executed by the processor, causes the user apparatus to: based on the user recipe input, create a consumption item data record based on the user recipe input and the first recipe; and associate the consumption item data record with a new recipe.

In another variant, the non-transitory computer-readable medium further comprises one or more additional instructions, which when executed by the processor, causes the user apparatus to provide the user consumption data record to a health tracking system.

In another variant, the non-transitory computer-readable medium further comprises one or more additional instructions, which when executed by the processor, causes the user apparatus to share the user consumption data record with one or more other user apparatus via a social data record.

In another variant, the non-transitory computer-readable medium further comprises one or more additional instructions, which when executed by the processor, causes the user apparatus to display published media records associated with the recipe tag to the user.

In another variant, the user consumption data record further comprises a time or a date.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 1A-1D are graphical representations of an exemplary recipe discovery and logging application, in accordance with the various principles described herein.

FIGS. 4A-4B are logical block diagrams of an exemplary server apparatus and health tracking devices useful in conjunction therewith, in accordance with the various principles described herein.

Figure 1A:
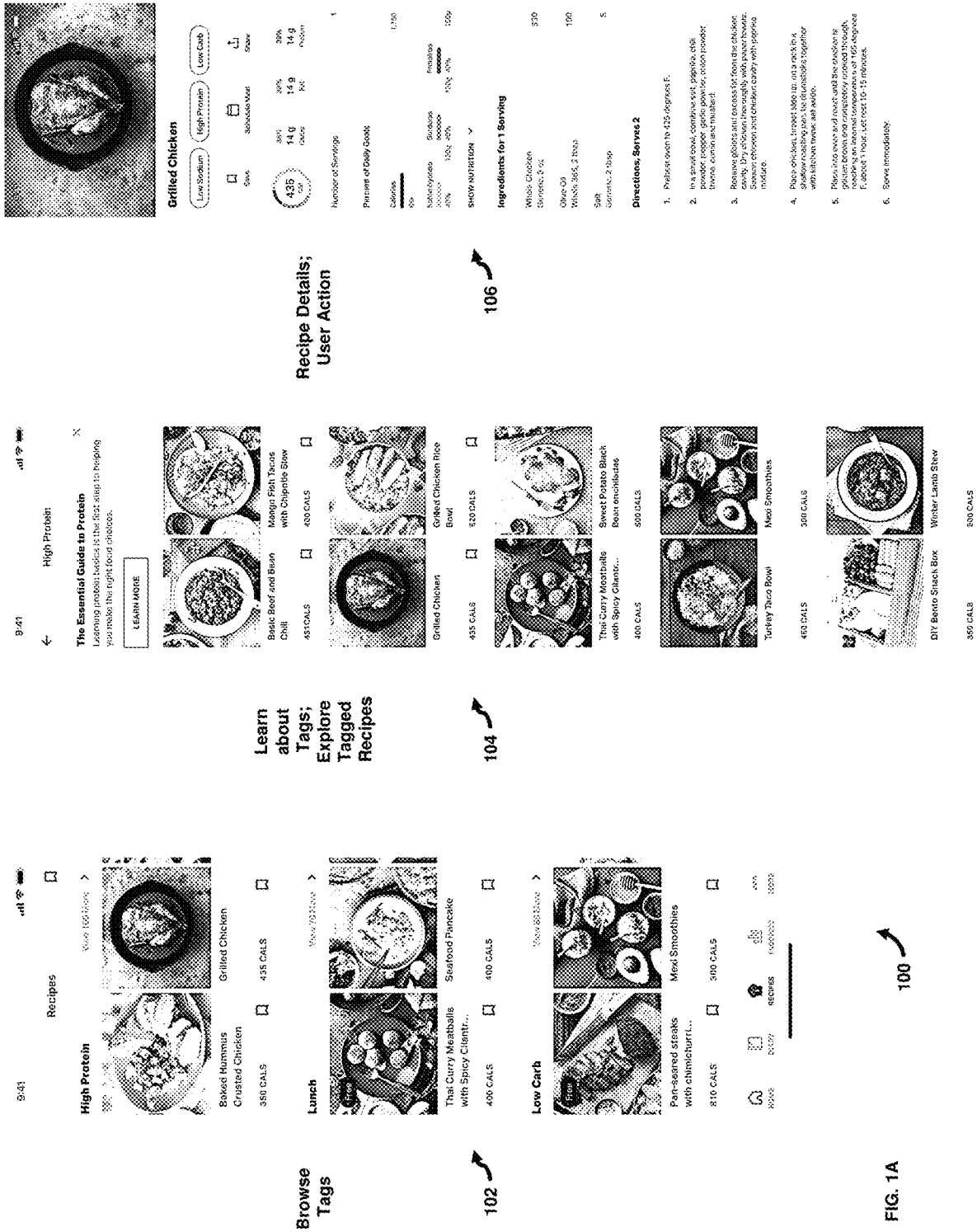

All Figures © MyFitnessPal, Inc. 2021. All rights reserved.

DETAILED DESCRIPTION

Disclosed embodiments include systems, apparatus, and methods and storage media which enable recipe discovery and consumption logging, to enable a user to make smarter choices and create healthier habits.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It is noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art will readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description is not to be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Recipe Discovery and Nutrition Logging

Historically, detailed nutrition management has been an esoteric art. For example, nutritionists and dietitians might closely monitor a patient to ensure that the patient meets a specific nutrient intake requirement in the controlled setting of a hospital. However, everyday consumers did not have ready access to specialized dietary knowledge and/or nutritional information regarding their daily meals. As a result, most diets have been limited to vaguely defined health or fitness goals such as e.g., "losing weight" or "building mass".

Recently, the breadth and depth of information on the Internet and the availability of connected health tracking devices (e.g., smart phones, etc.) have enabled a revolution in the health and fitness industries. Customer demand for meal tracking and other consumption logging technologies have also exploded. Additionally, food service industries (grocery stores and restaurants) have latched onto descriptive labeling trends (e.g., "low sodium", "high protein", "gluten free", etc.) and often provide detailed nutrition information. As a result, modern consumers are exposed to a plethora of overwhelming (and sometimes conflicting) health and fitness information.

Unfortunately, the existing ecosystem is disorganized and piecemeal. Certain companies regularly publish information via e.g., applications and websites, blogs, brochures, and other media sources, to assist the public in making educated health and fitness choices. Other companies may offer meal fulfillment services that pre-package meals (or ingredients for meal preparation) in set serving sizes. While these services may provide good information and/or convenience, no existing services integrate with the consumer's individualized personal fitness journey. For example, an individual with a particular combination of dietary sensitivity and fitness regime (e.g., a gluten intolerant marathoner) may be well aware of their own dietary idiosyncrasies, and yet still be unable to find recipes and/or nutrition information that they can regularly use. In other words, every individual is different, and a "one-size-fits-all" approach to personal nutrition and/or diet is inadequate for everyone.

Additionally, empirical evidence suggests that consumer confusion can manifest itself in other problematic ways. For example, many people quit meal tracking because annotating a meal diary after the eating decision has been made gives limited opportunity for pre-emptive nutrition feedback (healthy or not). Similarly, most meal diaries often don't have exactly the right ingredients, or generic ingredients that can't be modified. Thus, there may be limited confidence in meal entry (especially where one or more recipe ingredients have been modified or substituted). Lowered consumer confidence in meal tracking can be corrosive over time; users may be less motivated to track meals as tracking errors accumulate.

As a related note, individual behaviors span a wide range. While regular meal tracking may provide the best data and opportunities for nutrition feedback, a large segment of consumers lack the discipline and habits to keep meal tracking. Nonetheless, partial meal tracking and rough estimates of nutrient intake may still be useful information and/or foster personal growth. For example, consumers may gradually improve their habits over time, as they reap the rewards of diligent record keeping.

Improved solutions are needed to enable consumers to intelligently navigate their personal fitness journey and to consider their overall health in their exercise and dietary habits. There exists a persistent need to provide efficient and easy-to-use mechanisms for leveraging the health tracking data to make smarter choices and create healthier habits.

Example Operation

The exemplary solution described herein addresses both: (i) recipe discovery and (ii) consumption logging (meal tracking). In one aspect, recipe discovery is based on a multivariate nutrient focused interface that helps users discover and learn about recipes that satisfy their dietary needs. In another aspect, consumption logging leverages existing recipe information but also enables users to modify, and/or adjust recipes based on their actual consumption behavior. In one exemplary embodiment, these two aspects are synergistically combined in a two-pronged "discovery and logging user interface (UI)". The exemplary discovery and logging UI enables users to quickly discover recipes, modify the recipe on-the-fly, and/or log the recipe for consumption (in the past, present, and/or future).

FIG. 1A provides a broad overview of the exemplary discovery and logging user interface (UI) 100. As shown therein, the discovery and logging UI includes three (3) separate interfaces (102, 104, 106). In the first interface 102, the user can browse through various selected tags (e.g., "High Protein", "Lunch", "Low Carb", etc.). The second interface 104 provides information about the tags and allows users to discover recipes based on tags and/or other relevant parameters. The third interface 106 provides detailed information for selected recipes; in some variants, users can take further action (e.g., log, schedule, modify recipe ingredients, etc.)

Figure 1B:
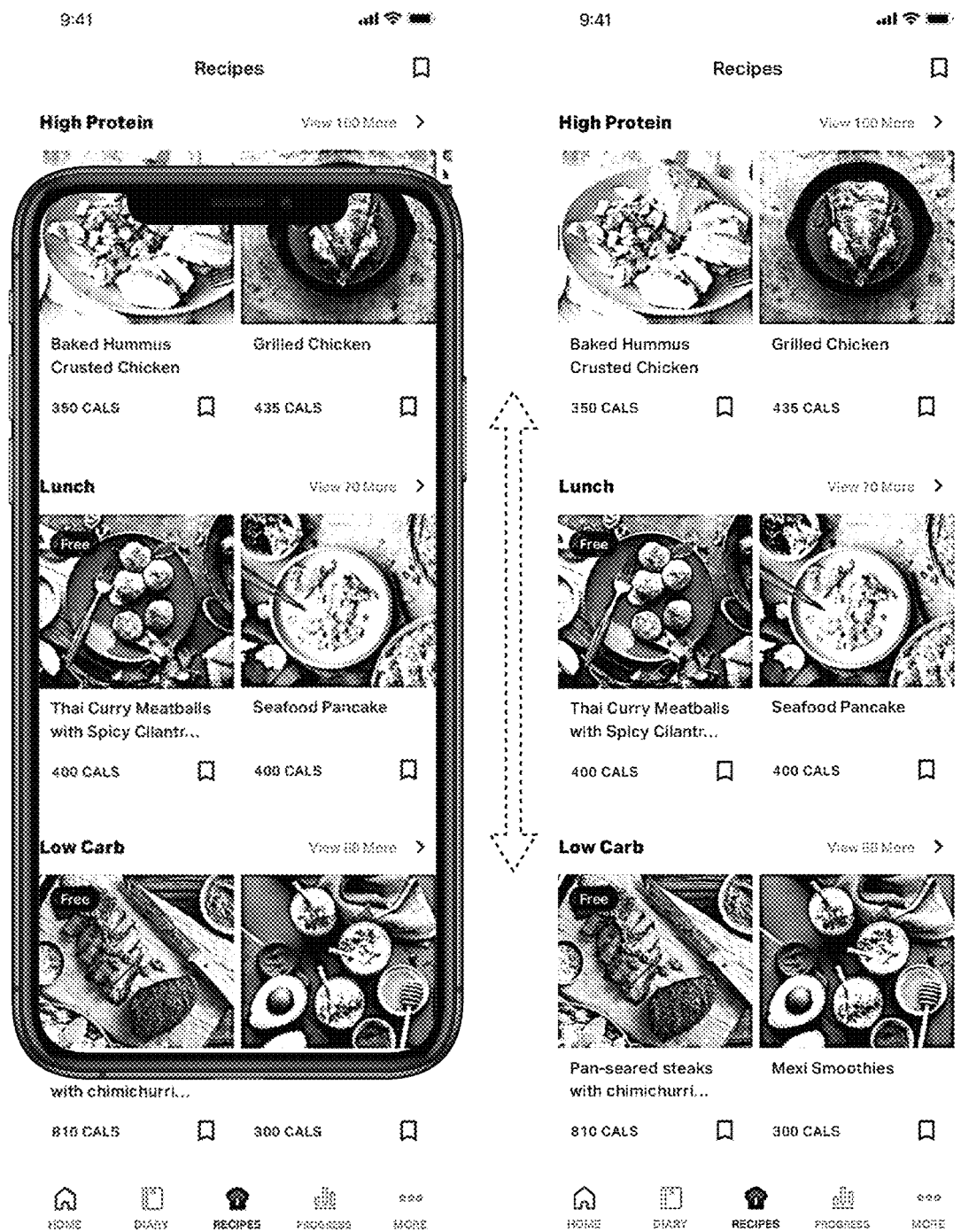

Referring now to FIG. 1B, the aforementioned recipe discovery interface 102 enables users to quickly navigate through relevant recipe tags. Each recipe tag may have a set of recipe exemplars. In the illustrated example, a user can scroll through the recipe tags using a vertical UI gesture (swipe up/down) to select e.g., "High Protein", "Lunch", "Low Carb". Each tag is associated with multiple recipe exemplars that match the tagged description; for example, "Baked Humus Crusted Chicken" and "Grilled Chicken" are High Protein recipe exemplars; a user interested in a particular tag can browse through the entire catalog of similarly tagged recipes ("View [Number] More", described in greater detail in FIG. 1C, infra). The illustrated recipe exemplars provide the user with a visually enticing image, a subset of important information (e.g., macronutrients), and convenient icon-based shortcuts (e.g., bookmark, log, schedule for later, etc.)

In some embodiments, the recipe discovery interface 102 may be configurable based on user preferences. For example, a user may prefer horizontal swiping in a "landscape" orientation (rather than the illustrated portrait orientation). Similarly, a user may prioritize, reorder, add, and/or remove recipe tags of interest. In some cases, a user may configure how recipe exemplars are displayed; for example, a user may prefer to see more or less detailed information e.g., bigger/smaller images, grams of protein, calories, grams of carbohydrates, other user reviews, etc. Other variations of the recipe discovery interface may be used with equal success.

In one exemplary embodiment, the recipes may be curated and tagged from a variety of sources. For example, an application and/or blog (such as the MyFitnessPlan® curated by the Assignee hereof) may periodically publish recipe articles for a variety of different readers. The recipe articles are intended for many segments of the public and may touch on a variety of different subjects; only a small subset of which may be useful to any single reader. Recipe tagging ensures that users can retrieve only the specific recipes of interest to them, without perusing the entire blog or scanning recipe articles. Moreover, users may independently find recipes from other sources, and tag them for later retrieval; in some cases, recipe tags may be pre-defined (e.g., the aforementioned "High Protein", "Lunch", "Low Carb") or user-generated (e.g., "Bill's Favorites", "Cheat Day", "Healthy Alternatives", etc.). User-tagged recipes can be privately stored within a user-specific private database, shared with other users in access-controlled databases, and/or the public in public access databases (e.g., social network databases).

In yet another embodiment, consumers may particularly benefit from integration with 3rd party meal fulfillment services. As a brief aside, meal fulfillment services are a burgeoning industry that offer meals (or meal preparation ingredients) delivered directly to the consumer. While meal fulfillment services control ingredients and portions (and thus can easily provide consumption information), most consumers only use meal fulfillment for a few meals out of every week. Additionally, many meal fulfillment services offer infrequent delivery (e.g., once a week); for cost reasons, consumers may be required to "opt-in" or "opt-out" far in advance of the actual eating decision. Within this context, the exemplary recipe discovery interface can greatly improve consumer uptake in meal fulfillment services; for example, a user can quickly browse to the current week's meals to log current eating decisions. Similarly, a user can browse to past meals to e.g., log a backlog of eating decisions. In some cases, a user may even be able to browse future meals to decide whether or not to opt-in, order alternatives, or skip the meal altogether. Similarly, some meal fulfillment services may be advertised, recommended, and offer convenient sign-ups to consumers via the recipe discovery interface.

Figure 1C:

FIG. 1C is an exemplary recipe selection interface 104 that educates users about a recipe tag of interest and enables recipe selection. In one exemplary embodiment, tags that have been generated by qualified nutritionists may include relevant information as to how/why the tag was assigned. For example, selecting the tag "High Protein" provides access to educational materials (e.g., "The Essential Guide to Protein") written by professional nutritionists, to help interested consumers learn about the importance of protein in diets. In some implementations, the educational materials may include links back to e.g., related articles and/or blog content that is similarly tagged.

In other implementations, tags that have been generated by other curators may include useful selection criteria and/or other tastemaker commentary. For example, specialists and/or special or celebrity users may use the recipe selection interface to communicate with (and monetize) their subscribing audience. A celebrity chef may provide literature as to his current culinary tastes and/or influences. Still other celebrities, athletes, and/or trainers may tag and/or comment on training tips associated with their diet. Similarly, software-based agents (e.g., artificial intelligence (AI), pattern matching, social networking, etc.) may automate recipe tagging and provide such information to its users. For example, a social networking scrubbing software may indicate which members of a user's network had "liked" certain recipes or promote recipes/products for ad revenue.

In the illustrated example of FIG. 1C, the user interface remains substantially consistent between recipe discovery 102 and selection 104 UIs. For example, a user can scroll through the recipes using a vertical UI gesture (swipe up/down); each recipe is presented in the recipe exemplar format e.g., a visually enticing image, a subset of important information (e.g., calories), and convenient icon-based shortcuts (e.g., bookmark, log, schedule for later, etc.) In some cases, user configuration of the recipe discovery and selection UIs may be identical (e.g., a user may configure both screens to use landscape rather than portrait orientations, etc.); in other cases, the user configuration of recipe discovery 102 and selection 104 UIs may be distinct and/or tailored for the specific recipe tag (e.g., the recipe discovery UI may show a generic macronutrient such as calories, whereas the "High Protein" recipes may focus on grams of protein, and "Low Carb" recipes may focus on grams of carbohydrates).

Still other implementations may use different UI formats to offer greater recipe selection capabilities. Notably, the number of recipes that are tagged may be substantially greater than the number of recipe tags; consequently, more sophisticated filtering and/or navigation may be required. For example, recipe selection may include additional layers of prioritization based on e.g., relevancy to the recipe tag, prioritization (bookmarked recipes, etc.), date of creation, date of last logging, ad promotion, etc. Still other implementations may enable multi-variate filtering (e.g., "cascading"). For example, "High Protein" may be further filtered based on "Low Carb", etc. Still other recipe selection formats may allow for no image, smaller (or larger) images, more (or less) information, and/or additional icon-based shortcuts (e.g., bookmark, log, schedule for later, etc.)

Figure 1D:
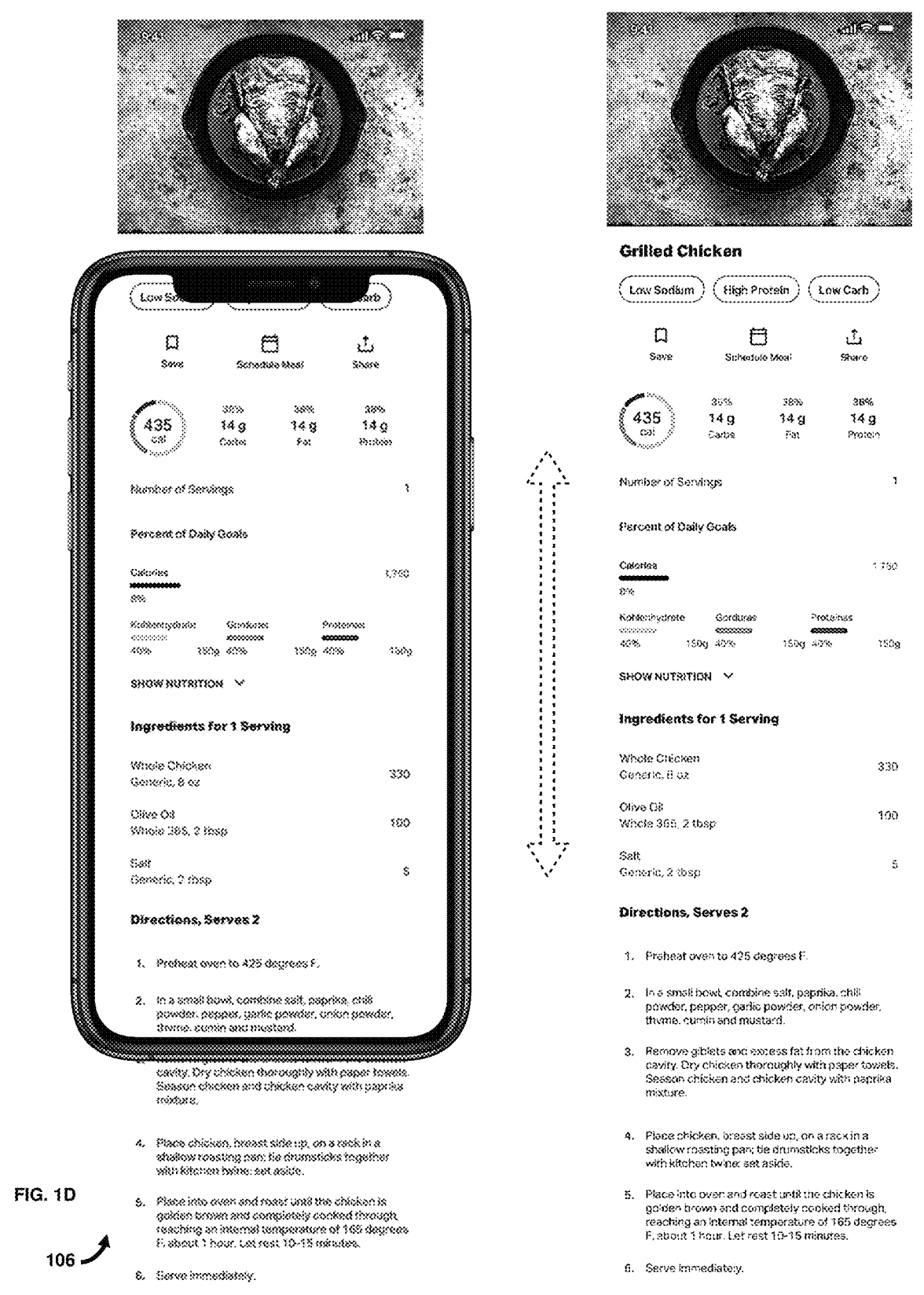

FIG. 1D is an exemplary logging interface 106 that enables users to log consumption activity for a selected recipe. As previously alluded to, consumption activity e.g., may be occurring, have previously occurred, or be scheduled to occur in the future. The illustrated logging interface 106 includes e.g., an image of the food, its associated recipe tags, and one or more icon-based shortcuts (e.g., bookmark, log, schedule for later, etc.)

In one embodiment, the logging interface further includes current recipe and logging information. For example, a user may be able to see macronutrients (e.g., calories, fat, protein), detailed nutrients, and/or a running percentage of daily con sum pti on (or goals). As with the other interfaces described in FIGS. 1B-1C supra, the illustrative logging interface has substantially similar user experience, but other variants may be configured to emphasize specific criteria and/or the user's personal interests. For example, some variants may allow a user to track their caloric intake over a week (or other period of time) so as to e.g., motivate the user to make better eating decisions over time. Still other interfaces may provide subjective motivational information (e.g., "This recipe is a good choice for today!", "There are better High Protein alternatives. Have you tried the Mango Fish Tacos with Chipotle Slaw?", etc.)

In some embodiments, the interface may additionally recommend recipes based on the selected recipe. In one exemplary embodiment, a user that has selected "Spaghetti" may be recommended other similar recipes (e.g., other pastas). In other embodiments, the interface may recommend recipes that better match a user's fitness goals (e.g., "Spaghetti Squash Noodles" for a user that is trying to eat more vegetables, etc.) In some cases, these recommendations may encourage eating more or less of a particular nutrient (e.g., more protein, more fiber, less sugar, etc.) In still other embodiments, the interface may recommend complementary dishes (e.g., a "Dinner Salad"). In some cases, complementary dishes may be based on previous user history, other users, crowdsourced databases, tastemakers, etc.

Referring back to FIG. 1D, some recipes may include recipe ingredients, portion size, and/or preparation instructions. Nutrient data for the recipe ingredients may be sourced from internal databases, external databases, and/or even provided by the consumer themselves. In one exemplary embodiment, the recipe ingredients and/or portion size can be dynamically modified so as to accurately reflect consumption behavior. For example, a user that splits a "Grilled Chicken" into halves to split with a co-eater can split their serving size in half, so as to log only their actual consumed amount. More granular ingredient splitting may also enable better nutrient calculation; for example, two co-eaters that split a "Grilled Chicken" into "Leg and Thigh (Dark Meat)" and "Breast and Wing (White Meat)" halves may receive different nutrient values. Still other recipe modifications (e.g., no salt, reduced oil) may be made consistent with actual consumption activity.

The foregoing discussion of the exemplary implementation is purely illustrative; artisans of ordinary skill in the related arts may add, remove, and/or substitute similar functionality, given the contents of the present disclosure.

Network Architecture

Figure 2:
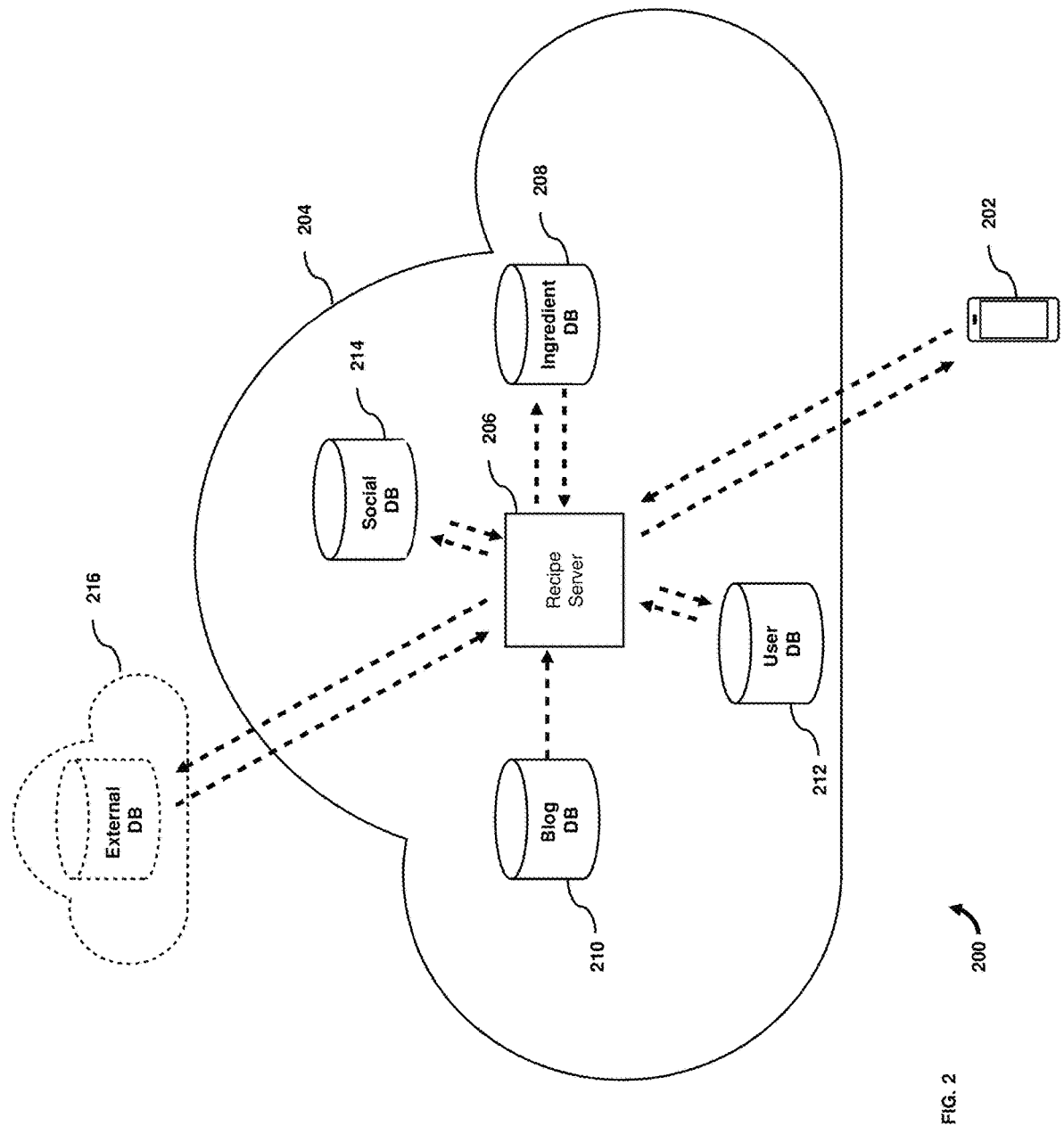
FIG. 2 is a logical block diagram of an exemplary network architecture configured to support recipe discovery and logging, in accordance with the various principles described herein.

Referring now to FIG. 2, an exemplary network architecture 200 for discovering recipes and/or logging consumption activity is shown. As illustrated, the system 200 includes one or more user devices 202 in communication with a health tracking network 204. In one exemplary embodiment, the health tracking network 204 may include one or more of a recipe server apparatus 206 in communication with an ingredient database 208, a blog database 210, a user consumption database 212, and a social networking database 214. In some implementations, the recipe server apparatus 206 may additionally support an external application programming interface (API) for access to/from external 3rd party databases 216 (which may provide additional e.g., ingredient information, blogs/publications, user history, social networking, etc.)

The health tracking network 204 may include one or more wired and/or wireless, private and/or public network, including but not limited to, e.g., the Internet. The health tracking network 204 is, for example, a wireless local area network (WLAN), wireless wide area network (WWAN), wired network, or any other suitable communication channel. Accordingly, each of the user devices 202, recipe server(s)

206, and databases (e.g., ingredient database 208, blog database 210, user consumption database 212, and social networking database 214) are configured with appropriate networking communication interfaces. An example of wired communication interface may include, but is not limited to, Ethernet; while examples of wireless communication interfaces may include, but are not limited to, near field communication (NFC), Bluetooth, WiFi, 4G or 5G LTE. It is further appreciated that various gateways, routers, switches, base stations, and so forth may be involved in facilitating and forwarding communication between the foregoing devices. Additionally, it is noted that the foregoing health tracking network 204 may be itself, composed of several networks, such that the described components are distributed in various ones thereof. In alternative embodiments, the health tracking network 204 may include a series of devices communicating within software via software API's.

As used herein, the term "database" refers to a structured set of data records held within a non-transitory computer-readable medium and/or the mechanisms used to e.g., add, remove, modify, and/or query and retrieve the stored data records. The term "data record" refers to a collection of data structures that represent an association, grouping, organization, or other collection of information; common examples of data structures include without limitation: numbers (integers, floating point), values (Booleans, enumerations), characters, strings, arrays (1D, 2D, N×D, etc.), lists, hash tables, etc. For example, a database may be queried for one or more data records that satisfy a particular condition; e.g., containing a particular string, value, etc.

The ingredient database 208 stores a plurality of data records associated with consumable items and/or their constituent ingredients. Each consumable item data record may include detailed descriptive information and other nutrition-related information associated with the consumable items. Consumable items may include single ingredient items (such as meat, fruit, vegetables, grains, etc.) as well as multi-ingredient items (referred to throughout as recipes, menu items, meals, etc.). Examples of important nutrition-related information include macronutrient information (e.g., calories, protein, fat, carbohydrates), micronutrient information (e.g., water-soluble vitamins, fat-soluble vitamins, minerals, fiber, water, etc.), allergen/intolerance information (e.g., lactose, gluten, peanut, etc.), ingredient type, ingredient size, portion size, and/or other food-related information. As used herein, the term "food" is used interchangeably with the word "consumable" to generally refer to one or more foods, beverages, and other consumables such as vitamins, supplements, medications, etc.

In addition to the nutritional information contained in the data records relating to consumable items, the data records may also include one or more images. The images may be professionally sourced or provided via the user population (crowd sourced). In some cases, images may include different stages of preparation and/or (e.g., raw ingredients, mid-preparation, final preparation, and/or user consumption). These data records may be uploaded to the ingredient database 208 from various sources including e.g., individual users (via user devices 202), manufacturers or providers of the consumables represented by the data records (such as restaurants or their representatives), and/or government or other 3rd party databases, etc.

In some implementations, the recipe data records may be self-contained. For example, a "Grilled Chicken" data record may include the various ingredients associated therewith (e.g., "Whole Chicken", "Olive Oil", "Salt"), associated portion sizes (e.g., 8 oz, 2 tbsp, 2 tbsp), corresponding nutrients (e.g., macronutrients, micronutrients, etc.), and/or recipe instructions. In other implementations, the recipe data records may themselves reference other data records. For example, the "Grilled Chicken" data record may derive its data record information from linked consumable item data records (e.g., a "Whole Chicken" data record, "Salt" data record, and "Olive Oil" data record).

The blog database 210 stores a plurality of data records associated with published media. Each published media data record may include relevant metadata (e.g., tags and/or other classifications) and/or media files. Media files may include text data (e.g., blog articles, etc.), audio/visual (A/V) data (e.g., images, audio, video), and/or audience viewing information (e.g., number of views, when viewed, popularity, etc.) In some cases, media may be "crawled" (automated text recognition, indexing, and/or storage) for tagged content. For example, a blog article that meets certain prescribed criteria may be automatically tagged; e.g., a recipe having a number of grams of protein per portion may be tagged "High Protein", etc. In other cases, articles may be manually categorized by e.g., the author and/or readers. For example, a video of a meal preparation may be manually tagged with e.g., "Lunch", etc. by the author (or viewers) of the video.

In some implementations, the same set of tags may be used in the blog database 210 and the ingredient database 208. For example, prescribed criteria may be used to crawl the ingredient database 208; e.g., "Grilled Chicken" may be automatically tagged with e.g., "High Protein" and/or "Low Carb" due to its macronutrients and portion size (when prepared according to the suggested recipe). Moreover, such implementations may additionally propagate tags into the published media from the recipe (and vice versa); for example, a blog article that includes the "Grilled Chicken" may be automatically tagged with "High Protein" and "Low Carb" because it inherits the tags of its included recipes. In other implementations, certain tags may be limited to certain databases; e.g., subjective tags such as "Lunch" may only be useful within e.g., the blog database 210 and/or social database 214.

For example, a blog article may be published to MyFitnessPal by a certified nutritionist that documents recent research regarding certain diets. The blog article may be stored in the blog database 210 with metadata such as e.g., authorship, date of publication, other user feedback (e.g., comments, ratings, "likes", etc.), included recipes, links to other blog articles, and/or related publication information. The nutritionist may tag the blog article as having "Lunch" recipes, and additionally confirm that the blog should also be tagged with "High Protein" and "Low Carb" (inherited from its cited recipes).

The user consumption database 212 stores a plurality of data records associated with actual or planned consumption. Each user consumption data record may include information including without limitation: nutrition-related information (macronutrients, micronutrients, etc.), time and/or date of consumption (or scheduled for consumption), portion size, consumption notes, and/or other user relevant journaling. For example, a user consumption data record for a meal might include e.g., date/time of consumption, food/drink consumed, macronutrients/micronutrients consumed, and user tags (e.g., "Light Lunch", "Pre-Race Carbo-loading", etc.)

The social database 214 stores a plurality of data records that describe past, present, or potential user interactions. For example, social data records may identify direct relationships (e.g., "friends", associations, direct messaging, etc.)

and/or indirect relationships (e.g., shared interests, similar behavior, related peer groups). In some cases, social data records may be linked with one or more of the ingredient database 208, blog database 210, and/or user consumption database 212. For example, a user may share images and/or video of their meal preparations for distribution to their social network. In other cases, users may share and/or re-publish e.g., interesting blog articles and/or recipes, etc.

It is appreciated that in the illustrated embodiment, the aforementioned databases (208, 210, 212, and/or 214) are separate and distinct from the recipe server 206 and/or user device(s) 202. However, in other variants, the databases may be incorporated in part or in whole with either the recipe server 206 and/or the user device(s) 202 for storage thereat. For example, user consumption data records that have been logged (or scheduled) at a particular user device 202 may be stored locally until e.g., synchronized with the network (or vice versa). Additionally, or in the alternative, ingredient data records (in whole or in part) may be stored at the recipe server 206 and portions may be made accessible to particular devices 202 when queried and/or locally cached. Any combination of the foregoing configurations may be utilized with equal success.

Methods

Figures 3A, 3B:
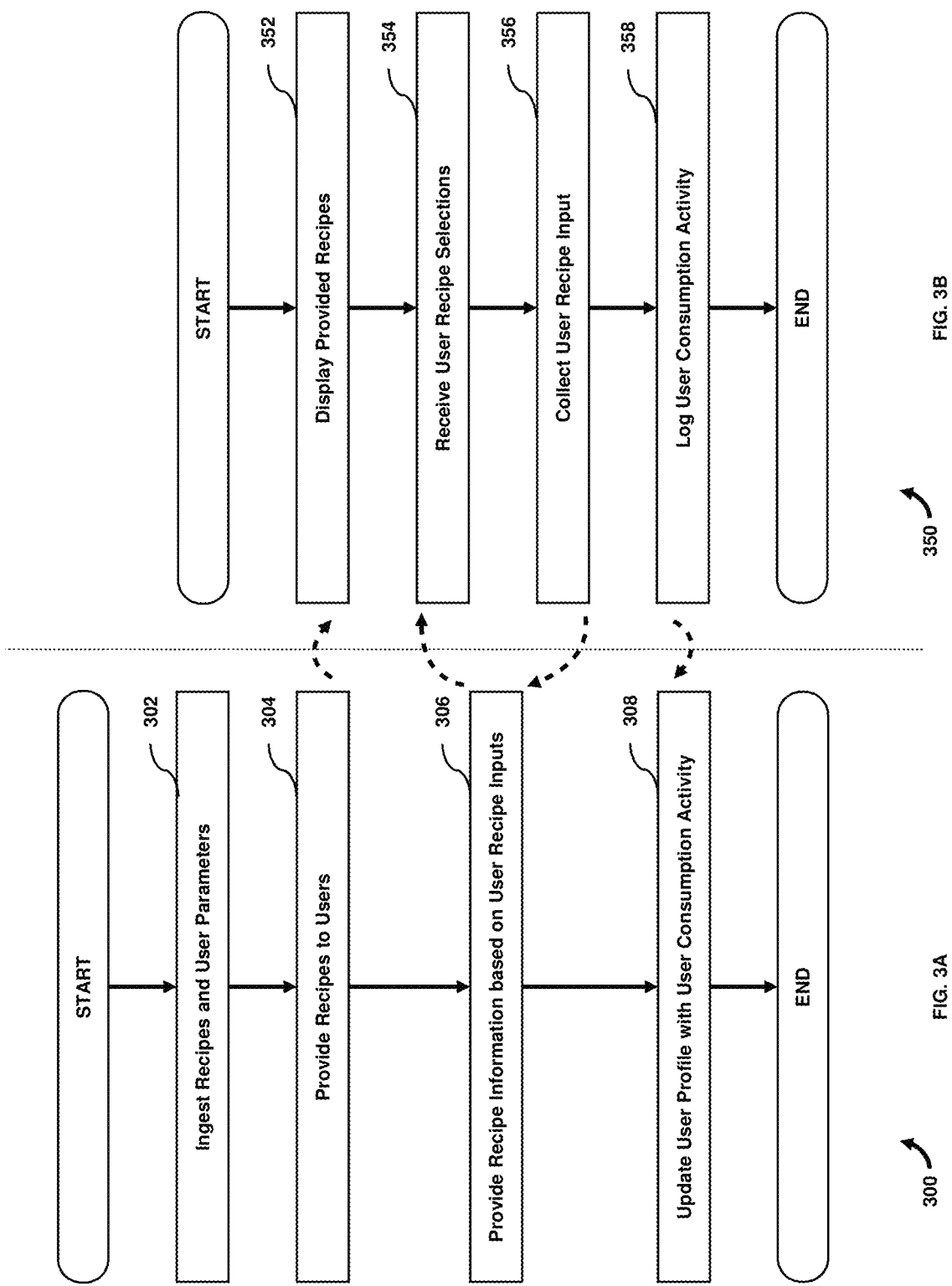
FIGS. 3A-3B are logical flow diagrams of methods for recording and logging recipes in a health tracking system, in accordance with the various principles described herein.

FIG. 3A is a logical flow diagram of one exemplary method 300 for enabling recipe discovery and/or logging user activity, useful in accordance with the various principles described herein.

At step 302 of the method 300, a health tracking system ingests recipes and user parameters. As used herein, "ingest" and "ingestion" refers to any addition, derivation, inference, and/or subsequent manipulation of data records for use within a database system. Ingestion may be manual (e.g., entry by a certified nutritionist, user, celebrity blogger, or other human), automatic (machine entry via e.g., a recipe server, crawling software, daemon process, 3rd party service, etc.), or a hybrid thereof (e.g., software identification with human acknowledgement, etc.) More generally, artisans of ordinary skill in the related arts given the contents of the present disclosure, will readily appreciate that virtually any scheme for data record entry may be substituted with equal success the following being purely illustrative.

In one exemplary embodiment, the health tracking system ingests recipes based on one or more published media (e.g., a blog entry, web article, text document, etc.) For example, a blogger may publish an article that popularizes a set of recipes for e.g., social enticement and/or ad revenue. In another such example, a software process may download articles and perform subject matter recognition (e.g., web crawling, machine learning, artificial intelligence, rules engines, and/or any other form of text recognition software.) Still other variants may receive recipe inputs via e.g., application programming interfaces (APIs) that are shared with 3rd parties (e.g., a meal delivery service, social network, tastemaker, etc.) Other forms of recipe ingestion may implement e.g., audio recognition and/or visual recognition. For example, television shows can be transcribed via manual or machine entry and/or relevant recipe information may be extracted therefrom.

A consumable item data record may be generated from the ingested recipe. For example, the consumable item data record may be created and/or populated with nutrition-related information associated with the consumable items. In one case, recipe ingestion may include identifying and/or deriving the appropriate macronutrient information (e.g., calories, protein, fat, carbohydrates), micronutrient information (e.g., water-soluble vitamins, fat-soluble vitamins, minerals, fiber, water, etc.), allergen/intolerance information (e.g., lactose, gluten, peanut, etc.), ingredient type, ingredient size, portion size, and/or other food-related information sufficient to populate the created consumable item data record. In some cases, the consumable item data record may additionally download, receive, or otherwise obtain e.g., images, associated text, and/or other metadata associated therewith.

Various embodiments of the present disclosure additionally associate one or more tags to the recipe as part of the ingestion process. For example, a celebrity blogger may manually attach one or more tags to their blog article (e.g., "Bill's Favorites"). In another such example, a certified nutritionist may create a specific rule; e.g., any recipe from any article that matches the rule may be tagged with an appropriate tag (e.g., a number of grams of protein per portion size may be identified as "High Protein"). The rules may be executed by a recipe server e.g., once, on a periodic basis, responsive to conditional events (blog updates), and/or any number of other specified events.

As used herein, the term "tag" refers to metadata (data about data) that identifies a logical association between data records. Data records having the same tag can be retrieved, selected, queried, manipulated, displayed, filtered, or otherwise referenced within the database system. While the present disclosure is described in the context of human-readable tags, artisans of ordinary skill in the related arts will readily appreciate that human-readable tags are purely illustrative. Tags may be computer-generated, computer-readable, and/or even obfuscated (e.g., indecipherable). As but one example, health and fitness data may need to be protected from illicit access; in some cases, consumption data may be obfuscated with an indecipherable hash.

As used herein, the term "conditional" refers to any action or event that is subject to one or more logical conditions or requirements being met. Common examples of conditional rules include e.g., "if-then", "only-if-then", "do-until", "perform-while-true", "case(s)", and/or other Boolean logic. While the conditional logic is described herein, artisans of ordinary skill in the related arts given the contents of the present disclosure will readily appreciate that non-Boolean based rules may be substituted for conditional rules with equal success. Common examples of non-Boolean rules include without limitation: machine learned rules, pattern-based rules, predictive rules and/or other techniques.

In some variants, the recipe may be required to satisfy a minimum validation check in order to be ingested. For example, the recipe must provide sufficient information to derive information (e.g., macronutrients may be inferred based on type and/or quantity of constituent ingredients) or to validate that the provided information is accurate (e.g., that the macronutrients provided match the type and/or quantity of constituent ingredients of ingredients entered). As but one example, a "Whole Chicken" that is composed only of "Leg and Thigh (Dark Meat)" and "Breast and Wing (White Meat)" must be consistent (i.e., the nutrient values should be complementary). In other variants, the recipe may require verification by other entities. In some cases, external verification may require certification (trust credentials) or other root of trust (e.g., trusted 3rd party verification, etc.) In other cases, external verification may simply be based on recipe popularity (e.g., the recipe may be verified via crowdsource.)

More generally, artisans of ordinary skill in the related arts will readily appreciate that database management may include a variety of steps to ensure that data records are consistently organized and/or managed. For instance, while crowd-sourced data entry can encourage community participation in an efficient and economic manner, individual entries may each be unreliable and should be policed for errors (e.g., typographic, erroneous, etc.) Other common database issues may include undesired replication and/or deletion of records, merging of records, inconsistent records, etc.

Referring back to FIG. 3A, in one exemplary embodiment, the health tracking system also ingests user parameters for one or more users. The user parameters may enable creation of a user profile. In one exemplary embodiment, a user may be ingested or "onboarded" into the user database via an online application. The online application may prompt the user for personal information. Common examples include e.g., name, age, race, gender, fitness and/or health goals, and other information (e.g., allergens, personal diet preferences, etc.) Based on the foregoing information, a user may be recommended with certain nutrient goals (e.g., caloric intake, fitness regimen, etc.) In other implementations, a user may be ingested or imported from an external database or 3rd party. For example, a meal delivery service may provide user information as part of the meal delivery service; in other examples, a medical professional may prescribe a particular nutrient goal based on various medical conditions (e.g., diabetes, kidney impairment, etc.)

In order to prevent malicious activity, the user may be required to verify their authenticity in order to create a user profile. For instance, the user may be required to provide proof of existence (via e.g., an external email account, phone number, or other personal verification method). Additionally, in some cases, a user profile may be validated to ensure that the user profile information is reasonable. For example, age, height and/or weight inputs may be verified to lie within the realm of possibility. In some cases, external verification of personhood may require certification (trust credentials) or other root of trust (e.g., trusted 3rd party verification, etc.) Still other techniques for managing user database integrity may be substituted with equal success by artisans of ordinary skill in the related arts.

At step 304 of the method 300, the recipe server provides recipes to users. In one exemplary embodiment, a user may be "pushed" a set of recipe data records based on e.g., user selection, social networking activity, advertising revenue, 3rd party services (e.g., meal delivery), or other health tracking system processes. For example, a recipe server may provide a set of recipes that were recently added in published media over a previous interval (e.g., weekly recipes featured in blog articles). In another such example, a user that has not met their personal health and fitness goals may be gently nudged to make healthier consumption choices with pushed recommendations. In another example, a user may be pushed recommended recipes from their social network, celebrity tastemakers, etc. In another such example, the recipe server may push recipe data records that are similar to, complementary with, or otherwise linked to user selections. For instance, a user that has requested "Spaghetti" may additionally receive other pasta data records.

In another exemplary embodiment, a set of recipe data records and associated recipe tags may be "pulled" by a user device based on e.g., user selection, the user's profile, recommendation engine, previous consumption history, or other client-side considerations. For example, a user may request via a client-side user interface (UI) that recipes that fit certain recipe tags (e.g., "High Protein", "Low Carb") be locally cached for convenient access. In another example, "Breakfast" consumable item data records may be pulled by a client device in the morning based on a history of breakfast consumption, "Lunch" consumable item data records may be pulled based on a user device's current location (e.g., nearby restaurants, etc.), and "Dinner" recipes may be pulled in the late afternoon based on meal delivery kits that haven't been consumed yet. In still another example, the user device may pull recipe data records that are similar to, complementary with, or otherwise linked to user selections. For instance, a user that has requested "Spaghetti" may additionally pull side dish data records (e.g., "Dinner Salad").

In some cases, a super set of consumable item data records may be pushed to a user and cached for internal retrieval. For example, a user may receive all recipes that were published on a blog within the past e.g., week, month, year, etc. Any of the recent recipes can be locally queried, viewed, manipulated, etc. at the user device without requiring further health tracking system interaction. Furthermore, it is appreciated that consumable item data records may be reused in multiple recipes or regularly used ingredients. As but one such variant, a user that frequently queries certain constituent ingredients may locally store a "pantry" (i.e., a cache of ingredients). For example, users that frequently eat chicken may receive a local pantry cache of multiple related data records (e.g., "Whole Chicken", "Chicken Half", "Chicken Quarter", "Chicken Thigh", "Chicken Breast", "Leg and Thigh (Dark Meat)", "Breast and Wing (White Meat)", etc.). In some variants, the locally cached "pantry" may further be used to prioritize and/or limit recipes that are pushed and/or pulled. For example, a user that has a pantry of chicken related data records may be pushed "Lunch" data records that include chicken constituents. In another example, a client device may pull down recipes that are based on a limited pantry of ingredients (chicken related data records may be prioritized).

In some situations, a hybrid of "push" and "pull" may be used. For example, a user may pull a first set of recipes, and be pushed a second set of recipes; e.g., a user may request "Cheat Day" recipes, which additionally cause "Healthy Alternatives" to be delivered in tandem. In other cases, a user that requests a set of recipe tags may be suggested similar recipe tags. For example, a user that has explicitly selected "Low Carb" and "High Protein" recipes may be pushed other recipes based on similar user profiles and/or related health or fitness goals (even if the user has not directly requested these recipe tags in their user profile). As another example, the user device may be pushed "Spaghetti" recipes, but based on internal user preferences automatically pull alternative ingredients (e.g., "Spaghetti Squash Noodles").

While the foregoing example is presented in the context of a recipe server and user device interaction, artisans of ordinary skill in the related arts will readily appreciate that information may be provided via alternative sources and/or avenues. A user device may send/receive consumable item data records from other user devices and/or other parties; e.g., a user may locally transfer a consumable item data record (e.g., "Grilled Chicken") and/or any required constituent consumable item data records (e.g., "Whole Chicken", "Olive Oil", "Salt", etc.) via the Internet or other data network (cellular, Wi-Fi, Bluetooth, etc.). In some cases, user transfers may occur in a broadcast or multicast manner; for example, a potluck dinner scenario may entail multiple users multicasting consumable item data records to each other. Similarly, a restaurant may broadcast its menu recipes to its patrons to facilitate easy logging. In another example, health supplement manufacturers may protect proprietary formulations by providing nutrition information via authorization and/or a "black box" consumable item data record that only provides limited nutrient data records (rather than identifying constituent consumable item data records).

At step 306 of the method 300, the recipe server provides recipe information. As previously alluded to, some consumable item data records may require modification based on actual user consumption activity; for example, a user may substitute other ingredients for recipes, change ingredient proportions, shift recipes mid-preparation, etc. Consequently, in one exemplary embodiment, the recipe server may provide updated recipe information based on user recipe inputs. As but one example, a user may have been pushed a "Grilled Chicken" that nominally includes the various ingredients associated therewith (e.g., Whole Chicken, Olive Oil, Salt), associated portion sizes (e.g., 8 oz, 2 tbsp, 2 tbsp), corresponding nutrients (e.g., macronutrients, micronutrients, etc.), and/or recipe instructions. However, the user may have substituted butter for olive oil; thus, the user device may subsequently request a "Butter" data record to enable proper logging (described in greater detail hereinafter).

Furthermore, while the foregoing example is presented in the context of a single ingredient substitution, it is further appreciated that multiple data records may be updated piecemeal over the course recipe preparation. A user preparing "Grilled Chicken" may change their mind mid-preparation making multiple ad hoc substitutions and/or additions throughout meal preparation. For example, a user may start preparing "Grilled Chicken" according to recipe, and then realize that the resulting product could be made into a more complete meal by adding rice and other ingredients for a "Grilled Chicken Rice Bowl".

In some embodiments, substitutions may be pushed to a user device based on a variety of other factors. For example, a meal delivery service may push the next week's recipes out to a user (to enable the user to schedule meals in advance). However, subsequent changes in the supply chain (such as the availability of seasonal ingredients, regional sourcing differences, etc.) may be pushed to the user's device so as to ensure that the data record cached at the user device accurately reflects the delivered meal. Similarly, a user may inaccurately log a consumed item "on-the-run" ("Hamburger") and later update the data record with the corrected information ("[Brand Name] Hamburger, Protein Style").

At step 308 of the method 300, the health tracking system updates the user profile with logged user consumption activity. As used herein, "log" and/or "logging" refers to any addition, derivation, inference, and/or subsequent manipulation of data records directed to user activity. Logging may be manual (e.g., entry by a certified nutritionist, user, celebrity blogger, or other human), automatic (machine entry via e.g., a recipe server, crawling software, daemon process, 3rd party service, etc.), or a hybrid thereof (e.g., software identification with human acknowledgement, etc.) More generally, artisans of ordinary skill in the related arts given the contents of the present disclosure, will readily appreciate that virtually any scheme for logging may be substituted with equal success the following being purely illustrative.

In one embodiment, a user consumption data record is created and associated with the user profile. In one exemplary embodiment, the user consumption data record is generated from e.g., time and/or date of consumption, a selected consumable item data record and any accompanying modifications thereto. Such modifications may include e.g., different portion sizes, added or removed constituent ingredients, and/or other relevant user input. For example, a user may additionally add personal notes and/or user tags (e.g., "Light Lunch", "Pre-Race Carbo-loading", etc.)

In some cases, user modifications to recipes may be discarded once logged. For instance, the resulting creation may be a one-time concoction (a user may be "using up leftovers"). Alternatively, user modifications may be successful enough to warrant the creation of a new consumable item data record (thereby enabling subsequent recreation, sharing with other users, and/or other post-preparation manipulation). In such cases, a user may be required to acknowledge and/or confirm the constituent ingredients, the amount used, the manner of making, and/or other user notes or media (e.g., preparation images, etc.)

In some variants, the newly created consumable item data record may be limited to the creator's user profile (and/or a limited distribution group). Validation and/or verification in such cases may be unnecessary. Similarly, some variants may additionally allow for post-consumption tagging. In some cases, the post-consumption tagging may be manual and/or user specific; in other cases, the post-consumption tagging may be automatic based on conditional rules.

In some embodiments, the user profile may be updated based on analysis of the user consumption data records. For example, a user that consistently falls below their personal health and fitness goals may receive encouragement and/or feedback to re-evaluate their goals. In some cases, user consumption data records may be matched against expected goals to ensure that adequate progress is being made. Logging is prone to error and/or misreporting; i.e., some users may consistently under or over report their consumption. Analyzing a variety of other health and fitness metrics may assist in user expectations and/or correct for misreported data. For example, a person that is consistently under reporting their nutrient consumption may show weight gain despite meeting their daily caloric intake. Under such situations, the health tracking system may further adjust the user's profile consistent with the corrected consumption and/or remind the user that tracking efficacy is based on diligent record keeping.

FIG. 3B is a logical flow diagram of one method 350 for recipe discovery and/or logging, useful in accordance with the various principles described herein.

At step 352 of the method 350, a user device displays a set of recipes. In one exemplary embodiment, the set of recipes are displayed in accordance with a set of recipe tags. In one embodiment, the recipe tags may be user defined based on the user's preferences (e.g., "Gluten Free", "Bill's Favorites", etc.) In other embodiments, the recipe tags may be populated with default recipe tags; for example, default recipe tags may be based on recent blog articles (e.g., ""High Protein", "Low Carb"). Still other recipe tags may be selected based on conditional rules (e.g., "Breakfast" recipe tags may be automatically populated in the morning, etc.) and/or non-Boolean rules (based on predictive rules, machine learned rules, etc.)

In one exemplary embodiment, the set of recipes may be received from a recipe server based on the e.g., user's profile. In other embodiments, a super set of recipes may be broadcast from the recipe server to multiple users, each of which filters the super set of recipes based on the user profile to focus on the subset of recipes that the user is interested in. Still other embodiments may hybridize client-side and server-side considerations. For example, the user may identify certain recipe tags of high interest, but be open to perusing suggested recipe tags proposed by celebrity tastemakers, etc.

At step 354 of the method 350, the user device receives user recipe selections and the user device collects user recipe input (step 356 of the method 350). In one exemplary embodiment, the set of recipes are displayed on a natively executed application running on a user's device (e.g., smart phone, watch, laptop, etc.). Exemplary embodiments are described in the context of a touch screen interface; however other forms of user interface (UI) may be substitute with equal success. For example, the set of recipes may be displayed via a web browser or other intermediary web portal; users may use a screen, keyboard, and mouse or other computer peripherals to interact with the displayed set of recipes. Similarly, certain devices (e.g., watches) may enable haptic and/or rumble-box feedback type interfaces. Auditory user interfaces may read recipes aloud and/or accept voice commands (microphones and speaker). More generally, artisans of ordinary skill in the related arts will readily appreciate that the recipes may be described with consumable item data records, which can be exposed via an application programming interface (API) to any $1^{st}$ party (manufacturer), $2^{nd}$ (trusted) party, $3^{rd}$ (untrusted) party for use within any mechanism for user interaction.

In one embodiment, the user may select recipe tags for more detail. In simple embodiments, a user that selects one recipe tags can browse the subset of recipes associated with the tag. Additionally, the user may peruse further literature and/or materials to peak the user's interest based on published media data records that can be retrieved from the health tracking system. For example, a user that has selected "High Protein" recipe tags may peruse blog articles that were similarly tagged. Additionally, a user that has selected a particular recipe tag e.g., "High Protein" may wish to see other user content regarding the selected recipe. For example, the other user content may include social networking posts, likes, shares, etc.

Certain recipe tags may be very common and thus retrieve a large number of recipe associations. In order to further winnow down the set of recipes, some user interfaces may enable multi-variate (cascaded) recipe filtering using multiple recipe tags. Previous recipe tag selections are propagated forward in a "cascading" manner to quickly enable a user to narrow in on their desired recipe of choice, based on recipe tags. For example, a user may be able to select all recipes that were tagged with both "High Protein" and "Low Carb". In some cases, the recipe discovery process may be an iterative process; the user device may provide a first query, and launch a subsequent query within those results, etc.

As used herein, the term "multi-variate" refers to any technique that may be performed on one or more variable data. Common examples of multi-variate techniques include e.g., filtering, aggregating, searching, unifying, separating, prioritizing, sorting, and/or other data manipulations. In one such example, multi-variate filtering may be performed in a cascaded manner (each iteration of results may be further filtered). Another common example may provide a first list filtered according to a first criteria, and a second criteria for prioritizing the results. Still other modes of data organization and/or presentation may be substituted by artisans of ordinary skill in the related arts, given the contents of the present disclosure.

In other embodiments, the set of recipes that are identified by the recipes may be ordered and displayed according to any number of prioritization schemes. In some cases, the prioritizations may be determined by the user (e.g., based on the user's profile, etc.) In other cases, the prioritizations may be determined based on server-side considerations (e.g., to promote new blog articles, ad revenue, meal delivery services, etc.) Still other implementations may allow users to interact with each other; for example, a user may be able to push recipe tags out and/or create joint queries (e.g., a first user's tag "Bill's Favorites", and a second user's tag "Gluten Free").

Once a user has selected a recipe from the set of recipes, the user may additionally further modify the selected recipe in view of their actual consumption activity. In one exemplary embodiment, user recipe input may be provided to the health tracking system and updated recipe information (if any) can be returned. While the foregoing disclosure is illustrated with respect to e.g., changes to portion sizes, and/or ingredient substitutions, a variety of other user recipe inputs may be used with equal success. For example, a user may change the method of preparation (e.g., grilling versus frying) which may alter the underlying nutrition assumptions for the selected recipe. Still other implementations may allow a user to dynamically query recipe mid-preparation; for example, a user that has prepared "Grilled Chicken" but decides they want to prepare a more substantial meal may switch to "Grilled Chicken Rice Bowl" via links to other recipes and/or consumable item data records.

In one exemplary embodiment, a user may share their selected recipe to e.g., their social network, family, friends, and/or other individuals (e.g., doctors, nutritionists, coaches, etc.). In some cases, the shared recipe may include additional user generated content for the selected recipe (e.g., preparation images, notes, etc.); social interactions are stored and/or queried from the social data records that can be retrieved from the health tracking system. In some cases, the user may control the nature and/or use of their own content. For example, a user may wish to limit of their friends, family, and/or other individuals can see their activity. In still other embodiments, a user that has selected a particular recipe e.g., "Grilled Chicken", may view links to another user's content regarding the selected recipe. In some cases, the user may see other related recipes, social network "likes", etc.

In one exemplary embodiment, a user that has selected a particular recipe can bookmark that recipe for later. In some cases, the bookmarked recipe may additionally be locally stored within the user's device (e.g., within the aforementioned "pantry" cache, etc.) In some embodiments, the bookmarked recipe may also be stored or associated with the user profile by the health tracking system; in this manner, a user can retrieve their bookmarked recipes at any device. Ideally, a user's bookmarked recipes should be identically reproduced at all user devices; as a practical matter however, database synchronization may not always be possible. Thus, the user profile may need to be re-synchronized (bookmarked recipe additions and/or deletions may need to be propagated throughout the network). Re-synchronization may occur on a periodic basis, manually initiated, conditionally executed, and/or at other specific events.

In one exemplary embodiment, a user that has selected a particular recipe can schedule that recipe for later preparation. As with bookmarked recipes, the scheduled recipe may additionally be locally stored within the user's device and/or synchronized with the health tracking system. In addition, the scheduled preparation may include notifications, alarms, and/or other reminders. As but one illustrative example, a user could schedule a meal for preparation a week in advance; the user may further enable notifications on their phone and/or haptic notifications on their watch. In some cases, the notifications may be set according to preparation time and/or planned consumption (e.g., a recipe that takes an hour to prepare may be scheduled for a 5 PM dinner, at 4 PM). In another such example, scheduling may take ingredient freshness into account; for example, recipes for a meal delivery service may have a "prepare no later than" date, scheduling the delivered meal after the recommended preparation date may either be prohibited outright, or cautioned against.

At step 358 of the method 350, the user device logs user consumption activity. In some cases, the user may be directed to confirm updates to the recipe. For example, a user may have initially prepared "Grilled Chicken", considered a "Grilled Chicken Rice Bowl", but ultimately decided to only eat the original "Grilled Chicken" recipe. Even though the user has received updated information, the actual consumption should only reflect what the consumer ultimately decided to eat. Actual user consumption may be stored as user consumption data records, which may be stored at either or both of the user device and the health tracking system (as previously described with reference to FIG. 3A).

In some embodiments, a user may be able to locally access their user consumption data records. In some cases, the user's immediate access to previous user consumption data records may be useful to e.g., make better consumption decisions, plan for future groceries, and/or used for other motivational purposes. In some cases, the user consumption data records can be made accessible via e.g., external application programming interfaces (APIs) to a variety of other tools.

More generally, artisans of ordinary skill in the related arts will readily appreciate that a wide expanse of usability may be necessary with user consumption. In an ideal world, recipe preparation and/or meal logging can be perfectly described and logged, yet real world considerations exist. While accuracy is important, "perfect" adherence is not required for user benefit; "good enough" may suffice to keep users on their personal health and fitness journey.

Apparatus

FIG. 4A is a logical block diagram of one exemplary server apparatus 400, useful in accordance with the various principles described herein. In one embodiment, the server apparatus 400 includes a processor 402, non-transitory computer-readable medium 404, and one or more network interfaces (e.g., a first network interface 406, and a second network interface 408).

The components of the exemplary server apparatus 400 are typically provided in a housing, cabinet or the like that is configured in a typical manner for a server or related computing device. It is appreciated that the embodiment of the server 400 shown in FIG. 4A is only one exemplary embodiment of a server 400 for the health tracking system. As such, the exemplary embodiment of the server 400 described herein with reference to FIG. 4A is merely representative of any of various manners or configurations of servers or other data processing systems that are operative in the manner set forth herein.

The processing circuitry/logic 402 of the server 400 is operative, configured, and/or adapted to operate the server 400 including the features, functionality, characteristics and/or the like as described herein. To this end, the processing circuit 402 is operably connected to all of the elements of the server 400 described below.

The processing circuitry/logic 402 of the host server is typically controlled by the program instructions contained within the memory 404. The program instructions 404 include a recipe discovery and logging application as explained in further detail supra. The recipe discovery and logging application at the server 400 is configured to communicate with and exchange data with the client-side recipe discovery and logging application running on a processor of the health tracking devices. In addition to storing the instructions 404, the memory 404 may also store data for use by the health tracking program. As previously described, the data may include the user profiles, user consumption data records, consumption item data records, social data records, and/or published media data records.

The network interfaces of the server 400 allows for communication with any of various devices using various means. In one particular embodiment, the network interface is bifurcated into a first network interface 406 for communicating with other server apparatuses and a second network interface 408 for communicating with user devices. Other implementations may combine these functionalities into a single network interface, the foregoing being purely illustrative.

In one exemplary embodiment, the first network interface 406 is a wide area network port that allows for communications with remote computers over the Internet (e.g., external databases). The first network interface 406 may further include a local area network port that enables communication with any of various local computers housed in the same or nearby facility. In at least one embodiment, the local area network port is equipped with a Wi-Fi transceiver or other wireless communications device. Accordingly, it will be appreciated that communications with the server 400 may occur via wired communications or via the wireless communications. Communications may be accomplished using any of various known communications protocols.

In one exemplary embodiment, the second network interface 408 is a network port that allows for communications with a population of health tracking user devices. The second network interface 408 may be configured to interface to a variety of different networking technologies consistent with consumer electronics. For example, the network port may communicate with a Wi-Fi network, cellular network, and/or Bluetooth devices.

In one exemplary embodiment, the server 400 is specifically configured to enable a user to discover and learn about one or more food items to e.g., make eating decisions in accordance with the principles described above. In particular, the illustrated server apparatus 400 stores one or more computer-readable instructions that when executed enable e.g., ingestion of recipes and/or user profile information, provision of recipes based on client-side and/or server-side considerations, provision of subsequent information in response to user recipe inputs, and updating and logging of actual consumption.

FIG. 4B is a logical block diagram of one exemplary user apparatus 450, useful in accordance with the various principles described herein. In one embodiment, the exemplary user apparatus 450 includes a processor 452, non-transitory computer-readable medium 454, a network interface 456, and a user interface 456.

In one exemplary embodiment, the user devices 450 are configured to enable a user to discover and learn about one or more food items to e.g., make eating decisions. User devices 450 may also be referred to herein as health and/or activity monitoring devices, or client devices. The user devices 450, in one exemplary implementation, include one or more portable computerized devices that are configured to e.g., query, obtain, display, modify, substitute, feedback, or otherwise provide nutrition information to a user. In an exemplary embodiment, the specific nutrition information that are displayed may include ingredient and/or recipe information.

In one exemplary embodiment, the user devices 450 are additionally configured to enable a user to log actual consumption. The user devices 450 may include one or more portable computerized devices that are configured to measure, obtain, monitor, generate, collect, sense, or otherwise receive nutrition data consumed by a user. In an exemplary embodiment, the specific nutrition data that are obtained includes portion size and/or food items that were actually consumed and/or other information regarding a user's actual eating habits. For instance, the user devices 450 may be specifically configured to enable a user to enter one or more food items for logging/tracking and/or future consumption.

In one variant, certain ones of the user devices 450 may include wearable health related parameter measurement and computing devices, such as e.g., a smart watch, an activity tracker, a heart rate monitor, a sleep tracking device, a nutrition tracking device, a smart scale, and/or smart eyeglasses. In addition, an exemplary user device 450 may include a smartphone having one or more of the foregoing capabilities and/or which enables user entry of the foregoing health data. Alternatively, the user device 450 may be in communication with a health and/or activity monitoring device.

Other examples of health parameter data may include data that the particular device 450 is configured to collect (such as athletic activity, biometric information, and environmental data). For example, an activity tracking device may be configured to collect activity data such as steps taken, distance traveled, rate or pace of a run, and/or flights of stairs climbed, etc.; a heart rate monitor may be configured to collect heartbeat data; a sleep tracking device collects data relating to how much time a user/wearer spends sleeping; a nutrition tracking device collects data relating to food and drinks consumed by a user; a smart scale collects data relating to a body weight, body fat percentage, and/or body mass index (BMI), etc. Furthermore, a smartwatch and/or smartphone, may be utilized as an activity tracking device, a heart rate monitor, a sleep tracking device, and/or a nutrition tracking device. The user device 450 may comprise any of the foregoing types of devices and/or may receive collected data from a first device at one or more applications running on the user device 450.

The exemplary user device 450 may be further configured enable entry and/or display of collected data. In such instances, the exemplary user device 450 may run one or more applications configured to process (e.g., transform) the collected data. Exemplary applications include e.g., UA Record™, MapMyFitness®, MyFitnessPal®, Endomondo®, etc. each owned by the Assignee hereof Other health activity related monitoring applications may additionally be utilized in connection with the present disclosure, such as those specifically designed to receive information from a particular type of health monitoring device (e.g., a 1st party application which is published by the device manufacturer, or 2nd party (trusted) or 3rd party (untrusted) applications designed to work in conjunction therewith); the foregoing being merely representative of the general concepts of the present disclosure.

Additionally, in one exemplary embodiment the application(s) running at the user device 450 include at least a discovery and logging application. The discovery and logging application enable a user to discovery recipes and/or log consumption. As discussed in greater detail supra, the discovery and logging application enables a user to discover recipes and actual consumption via communication to and/or coordination with a network side application run at the recipe server 400.

The above described system and method solves a technological problem common in industry practice related to effective and efficient presentation of recipes to a user. Moreover, the above-described system and method improves the functioning of the computer/device by allowing recipes data to be effectively discovered by the user along with a graphical user interface that makes actual consumption logging easier by presenting editable food item data records to the user.

Portions of the system and methods described herein may be implemented using one or more programs or suitable software code, such as the recipe discovery and logging application on the health tracking device and the health tracking program on the server, both described above, each of which may reside within the memory of the respective computing devices as software or firmware. Such programs and code may be stored in the memory and executed by the processor of the display device or a system server or other computer in communication with the display device. A computer program product implementing an embodiment disclosed herein may therefore comprise one or more computer-readable storage media storing computer instructions translatable by processing circuitry/logic, a CPU, or other data processing device to provide an embodiment of a system or perform an embodiment of a method disclosed herein. Computer instructions may be provided by lines of code in any of various languages as will be recognized by those of ordinary skill in the art.

A "computer-readable medium" may be any type of data storage medium that can store computer instructions and/or data, including, read-only memory (ROM), random access memory (RAM), hard disks (HD), data cartridges, data backup magnetic tapes, floppy diskettes, flash memory, optical data storage, CD-ROMs, or the like. The computer-readable medium can be, by way of example, only but not by limitation, an electronic, magnetic, optical, electromagnetic, infrared, or semiconductor system, apparatus, system, device, or computer memory. The computer-readable medium may include multiple computer-readable media storing computer executable instructions, such as in a distributed system or instructions stored across an array. A "non-transient computer-readable medium" may be any type of data storage medium that can store computer instructions, including, but not limited to the memory devices discussed above.

In the foregoing description, various operations may be described as multiple discrete actions or operations in turn, in a manner that may be helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The foregoing detailed description of one or more exemplary embodiments of the health tracking system with recipe discovery and/or logging has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

In another embodiment, a permanent copy of the programming instructions for individual ones of the aforementioned applications may be placed into permanent storage devices (such as e.g., memory) during manufacture thereof, or in the field, through e.g., a distribution medium (not shown), such as a compact disc (CD), or through communication interface (from a distribution server). That is, one or more distribution media having an implementation of the agent program may be employed to distribute the agent and program various computing devices.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for enabling recipe discovery and logging, comprising:
    ingesting a plurality of recipes;
    associating at least one recipe tag to a set of recipes of the plurality of recipes, wherein the associating the at least one recipe tag to the set of recipes comprises determining whether each recipe of the plurality of recipes satisfies a conditional rule of the at least one recipe tag, the conditional rule of the at least one recipe tag specifying at least a macronutrient quantity or a portion size;
    providing the set of recipes and the at least one recipe tag to a user device;
    displaying one or more recipes of the set of recipes associated with the at least one recipe tag to a user at a user apparatus comprising a user interface, a network interface, and a processor, said user interface configured to display a recipe discovery interface, a recipe selection interface, and a recipe logging interface, wherein said one or more recipes include first recipes displayed as a first group of recipes on the recipe discovery interface in association with a first recipe tag, and second recipes displayed as a second group of recipes on the recipe discovery interface in association with a second recipe tag;
    enabling selection of the first group of recipes or the second group of recipes on the user interface of the user device;
    in response to selection of the first group of recipes or the second group of recipes, displaying on the recipe selection interface one of an expanded recipe group, the first group of recipes, or the second group of recipes;
    enabling selection of a first recipe from the displayed expanded recipe group, first group of recipes or second group of recipes;
    in response to selection of the first recipe, displaying the recipe logging interface, the recipe logging interface including a plurality of ingredients;
    receiving user recipe input corresponding to a recipe portion of serving size or the plurality of ingredients for the first recipe;
    based on the user recipe input, creating a user consumption data record based on the user recipe input and the first recipe;
    displaying the user consumption data record on a display of the user device; and
    updating a user profile based on a user consumption data record associated with the selected recipe.

2. The method of claim 1, wherein the ingesting the plurality of recipes comprises (i) identifying recipes included in a database of a plurality of published literature, and (ii) retrieving the plurality of recipes from the published literature.

3. The method of claim 2, wherein identifying recipes included in the database comprises using text recognition software to identify the recipes.

4. The method of claim 2, wherein the associating the at least one recipe tag to the set of recipes of the plurality of recipes comprises copying the at least one recipe tag from the database of the plurality of published literature.

5. The method of claim 3, wherein the at least one recipe tag from the database was manually assigned by a trusted individual.

6. The method of claim 1 wherein the database is a blog database.

7. A health tracking system comprising:
    (A) a server configured to enable recipe discovery, the server comprising:
        a network interface for the server;
        a server processor; and
        a non-transitory computer-readable medium comprising one or more instructions, which when executed by the server processor, causes the server to:
            in response to a request for a consumable item data record, provide immediate access to the consumable item data record to a user device, wherein the consumable item data record comprises a recipe associated with a plurality of consumable item data records and a corresponding recipe portion of serving size;
            receive user recipe input from the user device, wherein the user recipe input identifies at least the consumable item data record comprising the recipe, and wherein the user recipe input comprises a modification to the recipe portion of serving size corresponding to the consumable item data record;
            create a user consumption data record based on the modification to the recipe portion of serving size for the user recipe input;
            associate the user consumption data record with a new recipe; and
            update a user profile based on the user consumption data record; and
    (B) a user apparatus comprising:
        a user interface configured to display a recipe discovery interface, a recipe selection interface, and a recipe logging interface;
        a network interface for the user apparatus;

a user apparatus processor; and
a non-transitory computer-readable medium comprising one or more instructions, which when executed by the processor, causes the user apparatus to:
display recipes associated with at least one recipe tag to a user, wherein said recipes include first recipes displayed as a first group of recipes on the recipe discovery interface in association with a first recipe tag, and second recipes displayed as a second group of recipes on the recipe discovery interface in association with a second recipe tag;
enable selection of the first group of recipes or the second group of recipes;
in response to said selection of the first group of recipes or the second group of recipes, display on the recipe selection interface an expanded recipe group, the first group of recipes, or the second group of recipes;
enable selection of a first recipe from the displayed expanded recipe group, first group of recipes or second group of recipes;
in response to selection of the first recipe, display the recipe logging interface, the recipe logging interface including a plurality of ingredients;
receive user recipe input corresponding to a recipe portion of serving size or the plurality of ingredients for the first recipe; and
based on the user recipe input, create a user consumption data record based on the user recipe input and the first recipe.

8. The health tracking server of claim 7 wherein the consumable item data record is retrieved from a blog database.

9. The health tracking server of claim 7, wherein the user consumption data record comprises a time or date of consumption.

10. The health tracking server of claim 7, wherein the user consumption data record comprises a scheduled time or date that has not yet occurred and a preparation time.

11. The health tracking server of claim 10, wherein the non-transitory computer-readable medium further comprises one or more additional instructions, which when executed by the processor, causes the health tracking server to: notify the user based on the scheduled time or date that has not yet occurred and the preparation time.

12. The health tracking server of claim 7, wherein the non-transitory computer-readable medium further comprises one or more additional instructions, which when executed by the processor, causes the health tracking server to: share the user consumption data record with at least one other user associated with the health tracking server.

13. The health tracking server of claim 7, wherein the update to the user profile is based on whether the user consumption data record adheres to a goal of the user.

14. The health tracking system of claim 7, wherein the user consumption data record comprises a modification to the first recipe based on the recipe portion of serving size or the plurality of ingredients for the first recipe.

15. The health tracking system of claim 14 wherein the non-transitory computer-readable medium further comprises one or more additional instructions, which when executed by the processor, causes the user apparatus to associate the consumption item data record with a new recipe.

16. The health tracking system of claim 15, wherein the non-transitory computer-readable medium further comprises one or more additional instructions, which when executed by the processor, causes the user apparatus to: provide immediate access to the user consumption data record to a health tracking system and to the user via the user interface.

17. The health tracking system of claim 7, wherein the non-transitory computer-readable medium further comprises one or more additional instructions, which when executed by the processor, causes the user apparatus to: share the user consumption data record with one or more other user apparatus via a social data record.

18. The health tracking system of claim 7, wherein the non-transitory computer-readable medium further comprises one or more additional instructions, which when executed by the processor, causes the user apparatus to: display published media records associated with the at least one recipe tag to the user.

19. The health tracking system of claim 7, wherein the user consumption data record further comprises a time or a date.

* * * * *